(12) United States Patent
Gantenbein et al.

(10) Patent No.: US 8,797,876 B2
(45) Date of Patent: Aug. 5, 2014

(54) IDENTIFICATION OF UNDERUTILIZED NETWORK DEVICES

(75) Inventors: Dieter Gantenbein, Zurich (CH); Bernhard Jansen, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 13/387,390

(22) PCT Filed: Jul. 27, 2010

(86) PCT No.: PCT/IB2010/053404
§ 371 (c)(1),
(2), (4) Date: Feb. 15, 2012

(87) PCT Pub. No.: WO2011/013064
PCT Pub. Date: Feb. 3, 2011

(65) Prior Publication Data
US 2012/0134271 A1    May 31, 2012

(30) Foreign Application Priority Data
Jul. 29, 2009   (EP) .................................... 09166685

(51) Int. Cl.
*H04L 12/26*    (2006.01)
(52) U.S. Cl.
USPC ............ 370/235; 370/252; 709/223; 709/241

(58) Field of Classification Search
CPC ..... H04L 41/12; H04L 41/142; H04L 43/026; H04L 43/028; H04L 43/0817; H04L 43/0882; H04L 43/04; Y02B 60/33; H04W 24/10; H04W 24/00; H04W 24/02; H04W 24/08; H04W 8/005; H04W 48/18; H04W 28/02; G06F 15/173; G06F 9/50; G06F 11/3055; G06F 11/3051
USPC ................ 370/230, 235, 254, 248, 250, 252; 709/220, 223, 224, 241
See application file for complete search history.

(56) References Cited

U.S. PATENT DOCUMENTS

| | | |
|---|---|---|
| 5,031,089 A | 7/1991 | Liu et al. |
| 2003/0020764 A1 | 1/2003 | Germain et al. |
| 2004/0061701 A1 | 4/2004 | Arquie et al. |
| 2004/0198371 A1* | 10/2004 | Balasubramanian et al. .......................... 455/452.2 |
| 2008/0175167 A1 | 7/2008 | Satyanarayanan et al. |

FOREIGN PATENT DOCUMENTS

CN    101067797    11/2007

* cited by examiner

*Primary Examiner* — Awet Haile
(74) *Attorney, Agent, or Firm* — Jeff Tang (57) ABSTRACT

A method, article of manufacture, and system for indicating underutilized network devices that provide services in a data communications network. The method includes: receiving network traffic data; filtering the network traffic data to eliminate data for predefined connections; producing, from the filtered network traffic data, a graph representing a connection between a first device and a second device within the data communications network; analyzing the graph to identify a set of interconnected nodes that is outside the data communications network; and indicating an underutilized network device by producing an output dependent on traffic rate data associated with a link to the identified set of interconnected nodes that is outside the data communications network.

20 Claims, 3 Drawing Sheets

IDENTIFICATION OF UNDERUTILIZED NETWORK DEVICES

CROSS-REFERENCE TO RELATED APPLICATION

This is a U.S. National Phase application which claims priority from International Application PCT/IB2010/053404, filed Jul. 27, 2010, which in turn claims priority from European Patent Application No. 09166685.9, filed on Jul. 29, 2009. The entire contents of both of these applications are incorporated herein by reference.

FIELD OF THE INVENTION

This invention relates generally to identification of underutilized network devices providing services in data communications networks. Methods, apparatus and computer programs are provided for identifying underutilized network devices with a view to restructuring the network to improve efficiency.

BACKGROUND OF THE INVENTION

A major challenge in today's information technology (IT) environments is energy efficiency. This is reflected in the fact that most of today's Green IT Projects aim to increase the efficiency of IT environments such as datacenters and data communications networks in general. There are various ways to increase efficiency, for example using advanced cooling systems in datacenters, or by virtualization of network devices whereby a single physical machine is logically partitioned into plural virtual machines. An apparently simple idea for improving efficiency is the decommissioning of unused hardware. The practical implementation of this idea, however, is by no means trivial. A key question is how to identify underutilized devices, i.e. those which are unused or not being used to a desired level, bearing in mind the number of devices, services, and overall operational complexity of a typical networked system. A datacenter, for example, may contain thousands of computer systems hosting many thousands of services. One known technique is to perform monitoring on each individual device to track utilization, normally by monitoring the state of the main processor, network interface, disk drive or any other component with a variable usage pattern. The monitoring process is complex, however, and the technique is difficult and time-consuming to set up if not already installed in the required systems in a given network. A network administrator might also assess device utilization by detailed analysis of an IT inventory. However, a sufficiently accurately maintained inventory, or indeed any inventory at all, may not be available. As with post-installation of individual device monitoring systems, producing an appropriate inventory specifically for purpose would likely be too much effort or prohibitively expensive.

SUMMARY OF THE INVENTION

A first aspect of the present invention provides a method for indicating underutilized network devices providing services in a data communications network. The method comprises, in a data processing system:

receiving network traffic data comprising, for each connection established with a network device, a source device identifier and a destination device identifier for the connection, data identifying a service provider and a service consumer for the connection, and traffic rate data indicating traffic flow rate on that connection;

filtering the network traffic data to eliminate data for predefined connections;

producing from the filtered data a graph representing the connections between devices indicated by the filtered data by links between nodes of the graph, the traffic rate data for a said connection being associated with the corresponding link in the graph;

analyzing the graph to identify any sets of interconnected nodes which are not connected to any other node representing a device within the network; and indicating any underutilized network devices by producing an output dependent on traffic rate data associated with any link to a said set from outside the network.

Methods embodying this invention can identify and indicate underutilized network devices by operating on basic network traffic data. The traffic data can simply identify source and destination devices, indicate the service provider and consumer, and provide information on traffic flow rate, for each connection established with a device in the network of interest. Such traffic data may be commonly available or can be obtained for networks as discussed further below. The traffic data may be first filtered to eliminate data relating to predefined connections. According to an embodiment of the invention the predefined connections are non-semantic connections. These are connections of a type not deemed semantically relevant to the utility assessment to be performed. A graph is then generated from the filtered data, the graph comprising links and nodes representing the connections between devices, and the traffic rate data for connections being associated with the appropriate links. This graph is then analyzed to identify particular entities referred to hereinafter as "islands". An island is a set of (one or more) interconnected nodes in the graph which is not connected to any other node representing a device within the network of interest. These islands are thus isolated node-sets which can only have links to nodes outside the network of interest. It is these islands which form the basis of the utility assessment. In particular, embodiments of the invention indicate underutilized network devices by generating an output which depends on traffic rate data associated with any link to an island from outside the network. This constitutes a practical and efficient system for identifying not only single underutilized devices but also groups of underutilized devises. Consider, for example, a typical web-services installation which consists of a web server, an application server and a database. Even if the system is unused, there will still be some network traffic, CPU usage or more general system usage on the individual computers implementing the web-services installation. The known technique of monitoring individual computers would not identify these devices as unused. In contrast, the island-based technique can identify that the constituent devices are unused by devices external to the island. Methods embodying the invention are thus highly efficient at identifying underutilized network devices. Instead of observing multiple devices individually, the number of observation points is effectively reduced to one, namely the network of interest. Moreover, since they require only basic, easily-obtainable network traffic data for operation, embodiments of the invention can be readily employed in existing networks without undue effort or expense.

The network over which methods embodying the invention are applied may in general comprise any set of interconnected devices whose utility is to be assessed, and might therefore constitute all or part of one or more proprietary networks or internetworks. The network devices themselves may in general comprise both real and virtual devices. Hence, a given device might constitute a physical machine in its own right, or might be a virtual machine sharing hardware resources of a single physical machine. For example, multiple OS (operating system) instances running in a partitioned manner on a single physical machine can be treated as different devices in embodiments of the invention. Also, any given device may in general provide one or more services in the network, and any given service might be provided by a single device or collectively by a group of devices. Numerous services, for example providing access to some resource, performing some requested operation, or supplying some requested information or functionality, can be envisaged here.

In general, any network traffic data providing the basic data described above can be utilized in embodiments of the invention. Particular examples are traffic records produced by the NetFlow network protocol or the IETF (Internet Engineering Task Force) standard Internet Protocol Flow Information Export (IPFIX). Where such systems are already operative in a network, the traffic records generated over a desired operating period can be used as input for methods embodying the invention. Alternatively, such a traffic flow monitoring system can be easily installed in a network for use in embodiments of the invention.

Methods embodying the invention can include the step of monitoring the network to generate the network traffic data. Embodiments might be envisaged where the utility assessment process is performed dynamically (e.g. at desired intervals), in response to dynamically generated network traffic data, to monitor device utilization during operation of a network. Alternative embodiments might be implemented offline based on data for a previous network operating period, for example as a one-off process prior to network consolidation or some other restructuring process. In any case, the generated output indicating any underutilized network devices in the network can be used to restructure the network accordingly. Hence, a second aspect of the invention provides a method for restructuring a data communications network. The method comprises:

performing a method according to the first aspect of the invention to produce said output indicative of underutilized network devices; and restructuring the network in dependence on said output to reduce underutilization of network devices.

In general, the network restructuring process might involve removing (decommissioning), modifying, merging, moving or otherwise adapting hardware or software, e.g. services applications, to improve overall device utilization. Depending on circumstances, the restructuring process might be implemented automatically under software control, or might be performed by network administrator in response to the output, or a combination of these two approaches might be employed.

Depending on the network in question, a variety of non-semantic connections might be predefined for elimination in the filtering process. In general, any connections which are not deemed meaningful or significant for the assessment of device utilization may be deemed non-semantic and specified for elimination. In particular, connections which tend to obscure or mask islands in the graph representing the network, e.g. by creating links between islands where semantically none exists, can be predefined for elimination here. This will be discussed further below in relation to various non-semantic connections which are predefined in preferred embodiments.

Following analysis of the graph to identify any islands as described above, underutilized network devices are indicated by producing an output dependent on traffic rate data associated with any link to an island from outside the network. For a given island there may be no such link to an external node, indicating that the island is unused. Where at least one link does exist to an external node, traffic rate data associated with that link may suggest underutilization of one or more devices in the island according to the service(s) associated with the connections to which the traffic rate data belongs. In any case, the output may indicate underutilized devices in a variety of ways. In a simplistic example, underutilized devices could be indicated implicitly by an output which simply indicates traffic flow rates associated with island devices, whereby an operator can identify undesirably low traffic levels. In preferred embodiments, however, the output explicitly indicates underutilized devices. In particular, the traffic flow rate indicated by traffic rate data may be compared with a predetermined threshold. The output may then identify one or more devices in the set which are associated with that traffic rate data as underutilized if the traffic flow rate is less than the threshold. For any given island, the output may be produced for all or only a subset of devices or services associated with that island. For example, the output may be produced in response to user input indicating devices/services of interest, and specifying the threshold(s) to be applied.

While alternatives might be envisaged, in an IP (Internet Protocol) networking scenario the source and destination device identifiers in the network traffic data may conveniently comprise the source and destination IP addresses for each connection. Embodiments might be envisaged where the data identifying the service provider and service consumer for a connection could simply be any data which distinguishes the provider and consumer. More usually, however, this data will comprise a service consumer identifier and a service provider identifier for the connection. These can conveniently comprise source and destination port numbers in an IP scenario. In general, the traffic rate data may comprise any data which provides an indication of traffic flow rates. This data may indicate traffic flow rates directly or indirectly. For example, this data may simply comprise an indication of the number of bytes, packets or other defined data units (most preferably number of bytes) transmitted over the connection, together with an indication of connection time, whereby the traffic volume over time can be determined. Additional data could of course be included here if desired for the utility assessment.

A third aspect of the invention provides a data processing system for indicating underutilized network devices providing services in a data communications network. The system comprises memory for storing network traffic data which comprises, for each connection established with a network device, a source device identifier and a destination device identifier for the connection, data identifying a service provider and a service consumer for the connection, and traffic rate data indicating traffic flow rate on that connection. The system further comprises control logic adapted to:

filter the network traffic data to eliminate data for predefined connections;

produce from the filtered data a graph representing the connections between devices indicated by the filtered data by links between nodes of the graph, the traffic rate data for a said connection being associated with the corresponding link in the graph;

analyze the graph to identify any sets of interconnected nodes which are not connected to any other node representing a device within the network; and indicate any underutilized network devices by producing an output dependent on traffic rate data associated with any link to a said set from outside the network.

Data processing systems embodying the invention may be implemented by one or more processing devices. In particular, a fourth aspect of the invention provides a computer program comprising program code means for causing a computer to perform a method according to the first or second aspects of the invention. The term "computer" is used in the most general sense and includes any device, component or system having a data processing capability for implementing a computer program. Moreover, a computer program embodying the invention may constitute an independent program or may be an element of a larger program, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

In general, where features are described herein with reference to an embodiment of one aspect of the invention, corresponding features may be provided in embodiments of another aspect of the invention.

BRIEF DESCRIPTION OF THE DRAWINGS

Preferred embodiments of the invention will now be described, by way of example, with reference to the accompanying drawings in which.

DETAILED DESCRIPTION OF THE PREFERRED EMBODIMENTS

Figure 1:
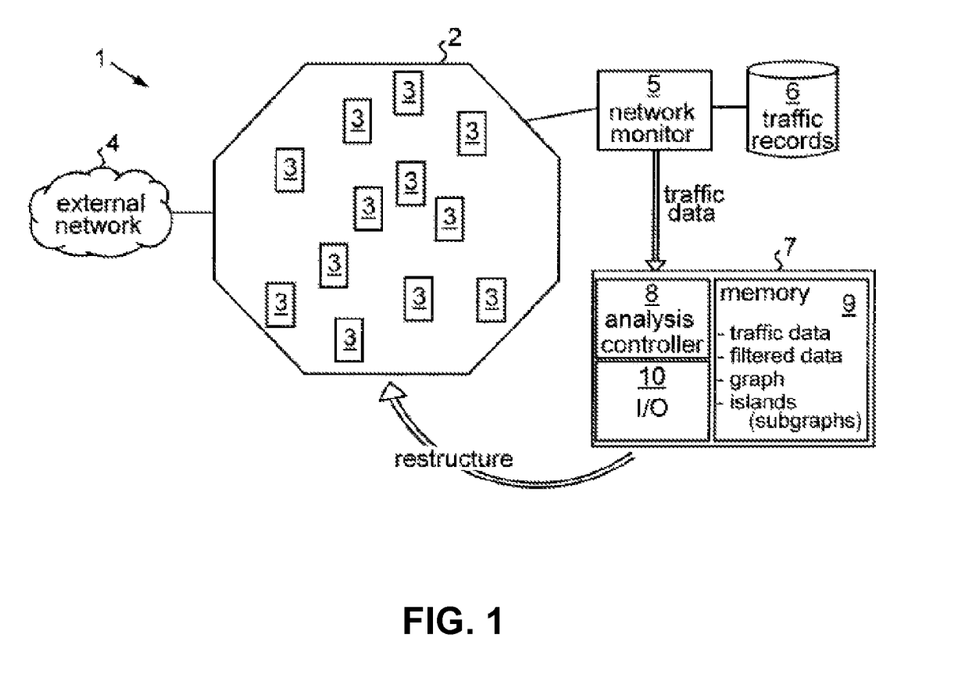
FIG. 1 is a schematic representation of a network system in which a network optimization system embodying the invention is employed.

FIG. 1 is a simplified schematic of an exemplary network system in which a network optimization process embodying the invention is employed. The system 1 comprises a network 2 containing a plurality of networked devices 3 whose utilization is to be assessed as part of the network optimization process. The devices 3, individually or in groups, provide a variety of services which can be accessed by other devices via network 2. Devices accessing these services may be inside or outside network 2. In particular, network-internal devices 3 can communicate with devices in one or more other networks which are represented simplistically in the figure by external network 4. In general, network 2 may represent any set of interconnected devices 3 in the area of interest ("in-scope"), and might therefore constitute all or part of one or more defined networks or internetworks. External network 4 typically comprises all external devices connecting to network 2 and may also comprise one or more defined networks or internetworks, though in general network 4 can be defined as desired in a given system. In the present example, network 2 is assumed to be a proprietary network providing services to the external network 4.

The system 1 includes a network monitor 5 which monitors traffic in network 2. In this example, network monitor 5 manages traffic flow information forwarded by exchange points such as switches, routers, etc. (not shown in the figure) in network 2 in accordance with the well-known NetFlow network protocol. Network monitor 5, implemented in this example by a general purpose computer running network monitoring software, coordinates the monitoring process and stores the resulting NetFlow traffic records in an associated database 6.

To assess efficiency of network 2 with a view to optimizing network performance, a utility assessment system 7 is provided in system 1. The utility assessment system 7 is operative to detect any devices 3 which are underutilized in network 2, i.e. devices which are unused or not being utilized to a desired level. The utility assessment system 7 comprises control logic in the form of analysis controller 8 which controls operation of system 7 generally and implements key steps of the utility assessment process to be described. In general, the control logic of analysis controller 8 could be implemented in hardware, software or a combination thereof. In this example, however, utility assessment system 7 is implemented by a general purpose computer and analysis controller 8 is implemented by software which configures the computer to perform the functions described. Suitable software will be apparent to those skilled in the art from the description herein. System 7 also includes memory 9 for storing various data used in the utility assessment process as described further below, and an I/O (input/output) system 10 providing a user interface. The I/O system 10 here can be implemented by the usual keyboard and display associated with computer 7.

In operation, when the efficiency of network 2 is to be assessed, analysis controller 8 obtains network traffic data for a desired operating period of the network. This traffic data is obtained from network monitor 5 in the form of the NetFlow traffic records stored in database 6 for the period in question. The subsequent operation of system 7 is indicated in the flow chart of FIG. 2. In step 20 of FIG. 2, the NetFlow data is received by analysis controller 8 and the key traffic data to be used in the utility assessment process is stored in memory 9. This traffic data contains various information about each connection established with (i.e. to or from) a device 3 in network 2. Specifically, the source and destination device for each connection are identified by the source and destination IP addresses. The source and destination port numbers for the connection identify the particular service for which the connection was established and identify which of the source and destination devices is the service provider, and which the service consumer, for that service. The traffic flow rate on the connection is indicated in this example by traffic rate data which specifies the total number of data bytes communicated via the connection together with the connection time.

Figure 2:
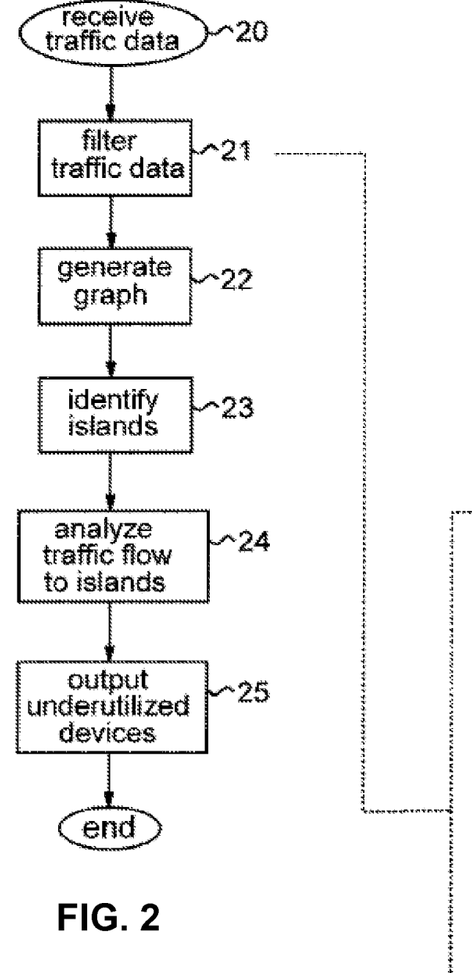
FIG. 2 indicates key steps of a utility assessment process performed in the embodiment of FIG. 1.

In step 21 of FIG. 2, analysis controller 8 filters the traffic data stored in step 20 to eliminate the data relating to predefined connections, in particular to predefined non-semantic connections. These non-semantic connections are connections which are not deemed meaningful for the utility assessment to be performed. Such connections tend to mask semantic dependencies between devices and hinder identification of islands in the process described below. The non-semantic connections are predefined in analysis controller 8. For example, analysis controller 8 may be preconfigured with a list of non-semantic connection types, and/or such connections for a given network may be defined by operator input via I/O interface 10. In the present example, the filtering stage 21 consists of three main filtering steps. The three steps of the filtering stage are shown in more detail in FIG. 3.

Figure 3:
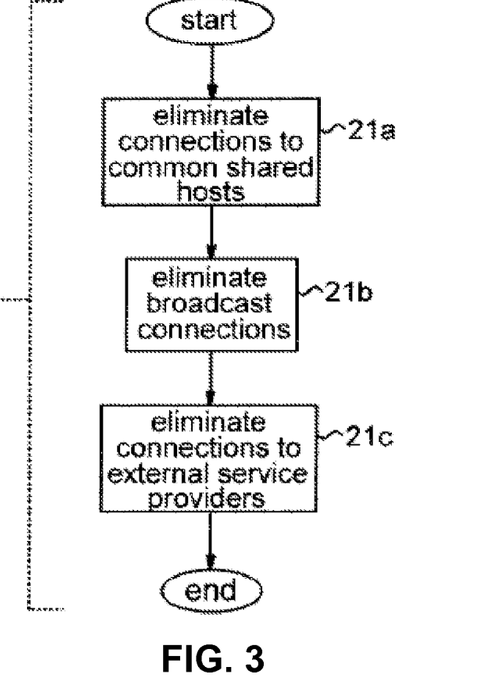
FIG. 3 indicates more detailed steps of a filtering stage of the FIG. 2 process.

Step 21a of FIG. 3 represents the first filtering step. This step involves eliminating the traffic data relating to connections to so-called "common shared hosts". These are devices providing predetermined routine services to network devices 3. Such routine services might include, for example, security monitoring services such as vulnerability scanning etc., provided by an intrusion detection system in network 2. Other examples of common shared hosts might be a company-internal web server publishing frequently-accessed information, e.g. lunch menus, to the network, or a software update server providing routine software updates to network hosts. Numerous other examples can be envisaged here. The routine services provided by common shared hosts tend to be provided on a regular basis to all network devices and the resulting connections tend to mask the semantic inter-relationships between network devices, creating dependencies which are misleading for the subsequent analysis. In particular, connections to common shared hosts tend to obscure or mask islands in the graph representing the network as described below by creating links between islands where semantically none exists. By eliminating these effects for predefined common shared hosts, step 21a of the filtering stage may significantly improve efficacy of the subsequent process.

The second filtering step is represented by step 21b of FIG. 3 and has a similar objective. This step involves eliminating the traffic data relating to connections carrying broadcast traffic. (The term "broadcast" is used here in a general sense to cover not only broadcast communications as strictly defined in the currently-applicable standard, but also similar communications such as non-standard broadcast, e.g. SMB (server message block) name service traffic in a windows environment, and multicast communications (multicast being essentially a special instance of broadcast). As before, such connections tend to mask semantic inter-relationships in the network, hindering the subsequent analysis process, and are therefore eliminated in this filtering step.

The third filtering step is represented by step 21c of FIG. 3. In this step analysis controller 8 filters out traffic data relating to connections for which the service provider is outside the network 2. While alternatives can be envisaged, in this example the service provider is determined by analysis controller 8 from the destination port for the connection. This filtering step effectively prepares one of the exit conditions for the search performed as part of the island identification process detailed below (ensuring that the search process stops if all nodes in-scope have been processed and does not continue to out-of-scope nodes). There are a number of reasons for performing this filtering step according to an embodiment of the invention. Firstly, the restructuring process is to be performed for network 2 based on utilization of devices providing services in this network. Hence, connections from a service consumer device in-scope, i.e. in network 2, to a service provider out-of-scope, in external network 4, are semantically irrelevant since the service provider is outside the area of interest and thus typically beyond influence. Secondly, this filtering step may prevent external devices forming connection points between otherwise unconnected internal devices 3. This would tend to cause merging of islands identified in the search process described below, thus masking true, semantic dependencies between devices 3. For example, if two hosts 3 in different islands each connect to an out-of-scope host like a software update server, the internal hosts 3 would appear to be connected through the external host when semantically no connection exists.

Returning to FIG. 2, on completing the filtering stage of step 21, operation proceeds to step 22 in which analysis controller 8 processes the filtered traffic data now stored in memory 9 to produce a graph representing the remaining, deemed-semantic connections. (The term "graph" here is used in the sense of a graph-theory graph). In such a graph representation, network devices (identified by their IP addresses) are represented by nodes of the graph and connections between devices are represented by links between nodes. In general, a link may represent one or more connections in the filtered traffic data depending on the number of connections between devices represented by a given pair of nodes. The traffic rate data for a given connection is associated with the corresponding link in the graph. In this embodiment, port numbers for each connection are also associated with the appropriate nodes in the graph. Thus, each node effectively represents a particular IP address and may have one or more associated port numbers for connections to/from that address. In this example, the traffic rate data for connections between a given IP address/port number pair is associated with the corresponding link in the graph. The resulting graph is stored by analysis controller 8 in memory 9.

In step 23 of FIG. 2, analysis controller 8 analyzes the graph to identify any islands in the graph. An island is defined as a set of interconnected nodes which are not connected to any other node representing an in-scope device, i.e. a device 3 within the network 2. Such an island may or may not have one or more links to outside nodes, but any such links necessarily represent inbound connections, that is, connections for which the service provider is in-scope, due to step 21c of the filtering stage. The island identification process performs depth first searching on the graph, marking nodes traversed in the search so that marked nodes are not traversed again in the search. Depth first searching is a generally known technique for processing graphs, but the process employed here will be briefly explained with reference to the diagram of FIG. 4.

Figure 4:
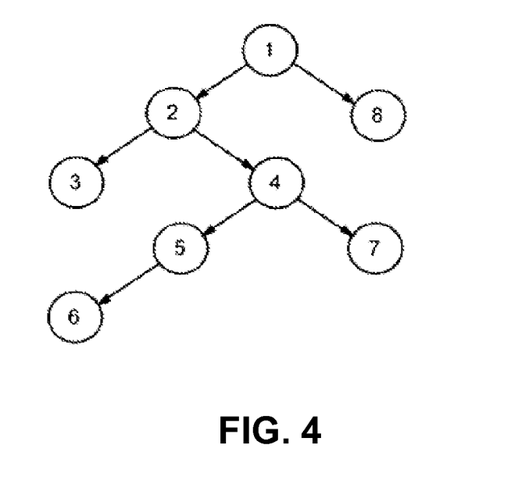
FIG. 4 is a diagram illustrating searching of a graph in the FIG. 2 process.

FIG. 4 represents a set of interconnected nodes in a graph as described above, with the numbers and arrow-heads indicating progression of the depth first search algorithm through the set. Initially, the search algorithm takes a random node out of the graph, here node 1. This node is marked as visited, and if there are one or more links from this node, a first link is randomly selected and followed to the next node, here node 2. The same process is repeated from node 2, thus reaching node 3. This node has no links, so the algorithm reverts to the preceding marked node, node 2, randomly selecting one of any remaining links to unmarked nodes. By repeating these basic operations, the search process recursively traverses the tree, finding connected nodes in the number order indicated in the figure. The marking of nodes avoids looping where a node is visited again. The recursive process is exited when one of the following conditions is satisfied: there is no next node, or the next node has already been visited (looping prevention) or the next node is out-of-scope (outside network 2). In this way, the search process identifies all nodes and links in an island as defined above. When the search algorithm terminates, analysis controller 8 moves (copies) the set of visited nodes and links (the subgraph representing the island) from the input graph, storing the subgraph separately in memory 10. If the input graph still contains at least one unmarked node, analysis controller 8 starts the search process again, choosing a random node and traversing the graph from there. This is repeated until the input graph is "empty" (i.e. contains no unmarked nodes).

Returning to FIG. 2, after identification of the islands in step 23, analysis controller 8 can then proceed to detect any underutilized network devices 3. Device utilization is assessed here by analyzing traffic flow on connections to islands from outside the network 2. Any such inbound connections will be represented in the network graph by a link to an island from an external device. By analyzing traffic rate data associated with any inbound links to islands, the analysis controller can identify underutilized devices. In particular, the traffic flow rate indicated by this traffic rate data can be compared with an appropriate threshold predefined in analysis controller 8. In general, one or more such thresholds may be predefined in system 7 for application as desired, e.g. one threshold for all inbound links to islands, different thresholds for different islands or connections to different IP addresses/port numbers. Also, the analysis controller could in general compare traffic flow rates associated with inbound links with the appropriate threshold(s) for all islands, or only a subset of islands/devices/services. In this example, however, the traffic threshold(s) to be applied can be input by an operator via I/O interface 10. Specifically, for a given analysis run, the operator can input the port numbers and the associated threshold(s) for which the analysis is to be performed. In step 24 of FIG. 2 the analysis controller then identifies the island(s) containing a node associated with a specified port number. For each such island, it is determined whether there is an inbound link representing at least one connection with the specified port number. If so, then the overall traffic flow rate indicated by the traffic rate data for the connection(s) to that port number is compared with the specified threshold. If the traffic flow rate is less than the threshold, the island is deemed underutilized and the underutilized devices are identified in step 25 in an output provided to the operator via I/O interface 10. If there is no inbound link representing a connection to the specified port number in an island, then the island is again deemed underutilized and the output is produced as before.

Figure 5:
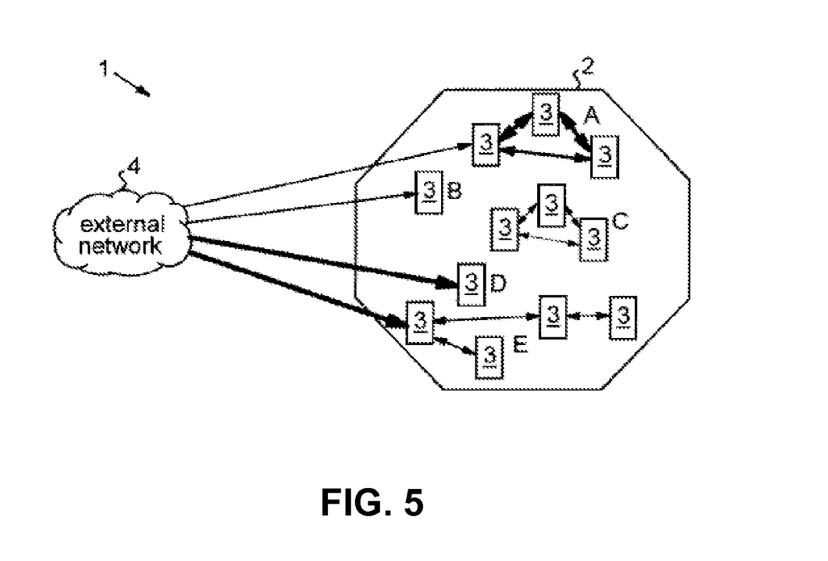
FIG. 5 is a schematic representation of traffic flow for islands in the FIG. 1 network detected by the process of FIG. 2.

Steps 24 and 25 of FIG. 2 can be repeated as desired in response to operator input specifying different port numbers and associated thresholds. In this way, underutilized islands, and hence underutilized network devices 3, can be identified and the network 2 can be restructured accordingly to improve efficiency. FIG. 5 provides a simple representation of exemplary results for an analysis of network 2. Here five islands, labelled A to E have been identified. The islands are connected as shown by the arrows, with higher traffic flow rates being simply represented by bolder arrows. Clearly if there is no inbound link to an island, as for island C, then the island devices are unused. Such devices can simply be removed from network 2 (decommissioned). If an island has one or more inbound links with unduly low traffic levels, like islands A and B here, then one or more island devices will be deemed underutilized (at least insofar as a subset of its services is concerned where the device provides more than one service). The network might be restructured in a variety of ways to address this. For example, different devices might be consolidated, for example by virtualization of plural devices in one physical machine, or devices or services might be moved within the network, or resident services might be removed in favour of outsourced services. In general, any restructuring action which reduces underutilization of devices 3, and hence improves overall efficiency of the network, may be taken here as deemed appropriate. This restructuring process can be implemented wholly by the network operator, though embodiments might be envisaged where analysis controller 8 is programmed to implement certain restructuring tasks on detecting underutilization of devices.

It will be seen that the foregoing provides a practical and efficient system for identifying underutilized network devices and restructuring the networks accordingly. The system can detect not only single underutilized devices but also groups of underutilized devices, increasing the probability of identifying underutilized hosts or applications which are genuinely underused and which can be therefore be shutdown. By shutting down such systems, significant power and resource savings can be achieved. In a typical datacenter for example, savings of 5 to 30% can be realistically envisaged. In addition, the basic network traffic data required for operation is readily obtainable. This can either be retrieved from existing traffic records where available, or can be easily generated by network observation and extraction of basic data. Embodiments of the invention can thus be employed in existing networks without undue effort or expense, either as a one-off process prior to planned network consolidation or for regular efficiency analysis.

It will of course be appreciated that various changes and modifications can be made to the specific embodiments described above. For example, while a simple flow rate threshold is employed to identify underutilized devices in the embodiment described, a more complex thresholding technique or other algorithm which uses additional data as well as the traffic rate data could be employed in other embodiments. While network monitor 5 and utility assessment system 7 are indicated as shown as separate entities in FIG. 1, in general the functionality of these systems could be implemented on one or more computers. Many other changes and modifications can be made to the exemplary embodiments described without departing from the scope of the invention.

The invention claimed is:

1. A method of indicating underutilized network devices that provide services in a data communications network, wherein the method is implemented in a data processing system and comprises:
 receiving network traffic data, wherein the network traffic data comprises: for a connection established with a device within the data communications network, (i) a source device identifier and a destination device identifier for the established connection, (ii) data identifying a service provider and a service consumer for the established connection, and (iii) traffic rate data indicating a traffic flow rate on the established connection;
 filtering the network traffic data to eliminate data for predefined connections;
 producing, from the filtered network traffic data, a graph representing a connection between a first device and a second device within the data communications network, wherein the graph includes: (i) a link and a set of nodes representing the connection between the first and second devices, and (ii) the traffic rate data for a connection that is associated with a corresponding link in the graph;
 analyzing the graph to identify a set of interconnected nodes that is outside the data communications network, wherein the identified set of interconnected nodes is a set of nodes that is not connected to another node that represents a device within the data communications network; and
 indicating an underutilized network device by producing an output dependent on traffic rate data associated with a link to the identified set of interconnected nodes that is outside the data communications network.

2. The method according to claim 1, further comprising:
restructuring the data communications network based on the output to reduce underutilization of network devices.

3. The method according to claim 1, further comprising:
monitoring the data communications network to generate the network traffic data.

4. The method according to claim 1, wherein:
the predefined connections comprise a connection to a network device that provides a predetermined routine service to a device that is within the data communications network.

5. The method according to claim 1, wherein:
the predefined connections comprise a connection that carries broadcast traffic.

6. The method according to claim 1 wherein:
the predefined connections comprise a connection for which the service provider is outside the data communications network.

7. The method according to claim 1, wherein:
producing the output is performed by comparing the traffic flow rate indicated by the traffic rate data associated with a link to the identified set of interconnected nodes that is outside the data communications network with a predetermined threshold, and wherein the output indicates underutilization of a device in the identified set of interconnected nodes if the traffic flow rate is less than the predetermined threshold.

8. The method according to claim 1, wherein:
producing the output is in response to user input indicating a connection represented by a link to a set from outside the data communications network, and wherein the output indicates an underutilized network device associated with the connection indicated by the user input.

9. The method according to claim 1 wherein:
analyzing the graph comprises performing depth first searching on the graph and marking nodes as traversed in the depth first search, wherein the marked nodes are not traversed again in the depth first search.

10. The method according to claim 1 wherein:
the source and destination device identifiers respectively comprise source and destination IP addresses for the established connection.

11. The method according to claim 1 wherein:
the data identifying the service provider and the service consumer for the established connection comprises a service provider identifier and a service consumer identifier for the established connection.

12. The method according to claim 11, wherein:
the service provider identifier and the service consumer identifier respectively comprise destination and source port numbers.

13. The method according to claim 8, wherein:
the user input comprises a port number for indicating the connection indicated by the user input.

14. An article of manufacture tangibly embodying computer readable non-transitory medium which, when implemented, cause a computer to carry out the steps of the method of indicating underutilized network devices that provide services in a data communications network, the method comprising:
receiving network traffic data, wherein the network traffic data comprises: for a connection established with a device within the data communications network, (i) a source device identifier and a destination device identifier for the established connection, (ii) data identifying a service provider and a service consumer for the established connection, and (iii) traffic rate data indicating a traffic flow rate on the established connection;
filtering the network traffic data to eliminate data for predefined connections;
producing, from the filtered network traffic data, a graph representing a connection between a first device and a second device within the data communications network, wherein the graph includes: (i) a link and a set of nodes representing the connection between the first and second devices, and (ii) the traffic rate data for a connection that is associated with a corresponding link in the graph;
analyzing the graph to identify a set of interconnected nodes that is outside the data communications network, wherein the identified set of interconnected nodes that is outside the network is a set of nodes that is not connected to another node that represents a device within the data communications network; and
indicating an underutilized network device by producing an output dependent on traffic rate data associated with a link to the identified set of interconnected nodes that is outside the data communications network.

15. A data processing system for indicating underutilized network devices that provide services in a data communications network, the data processing system comprising:
memory for storing network traffic data, wherein the network traffic data comprises: for a connection established with a device within the data communications network, (i) a source device identifier and a destination device identifier for the established connection, (ii) data identifying a service provider and a service consumer for the established connection, and (iii) traffic rate data indicating a traffic flow rate on the established connection, and
control logic adapted to:
filter the network traffic data to eliminate data for predefined connections;
produce, from the filtered network traffic data, a graph representing a connection between a first device and a second device within the data communications network, wherein the graph includes: (i) a link and a set of nodes representing the connection between the first and second devices, and (ii) the traffic rate data for a connection that is associated with a corresponding link in the graph;
analyze the graph to identify a set of interconnected nodes that is outside the data communications network, wherein the identified set of interconnected nodes is a set of nodes that is not connected to another node that represents a device within the data communications network; and
indicate an underutilized network device by producing an output dependent on traffic rate data associated with a link to the identified set of interconnected nodes that is outside the data communications network.

16. The method according to claim 2, further comprising:
monitoring the data communications network to generate the network traffic data.

17. The method according to claim 2, wherein:
the predefined connections comprise a connection to a network device that provides a predetermined routine service to a device that is within the data communications network.

18. The method according to claim 2, wherein:
the predefined connections comprise a connection that carries broadcast traffic.

19. The method according to claim 2, wherein:
the predefined connections comprise a connection for which the service provider is outside the data communications network.

20. The method as claimed in claim 12, wherein:
the user input comprises a port number for indicating the connection indicated by the user input.

* * * * *